(12) United States Patent
Karpov et al.

(10) Patent No.: US 12,540,549 B2
(45) Date of Patent: Feb. 3, 2026

(54) INSERT ASSEMBLY FOR A ROTARY APPARATUS, RELATED APPARATUS AND METHOD

(71) Applicant: COOLBROOK OY, Helsinki (FI)

(72) Inventors: Alexander Karpov, Helsinki (FI); Denis Semenov, Helsinki (FI); Veli Matti Purola, Helsinki (FI)

(73) Assignee: COOLBROOK OY, Helsinki (FI)

( * ) Notice: Subject to any disclaimer, the term of this patent is extended or adjusted under 35 U.S.C. 154(b) by 0 days.

(21) Appl. No.: 18/842,340

(22) PCT Filed: Mar. 1, 2023

(86) PCT No.: PCT/FI2023/050117
§ 371 (c)(1),
(2) Date: Aug. 28, 2024

(87) PCT Pub. No.: WO2023/166247
PCT Pub. Date: Sep. 7, 2023

(65) Prior Publication Data
US 2025/0188841 A1    Jun. 12, 2025

(30) Foreign Application Priority Data

Mar. 2, 2022 (FI) .................................. 20225189

(51) Int. Cl.
*F01D 1/12* (2006.01)
*B01J 19/18* (2006.01)
(Continued)

(52) U.S. Cl.
CPC ............ *F01D 1/12* (2013.01); *B01J 19/1831* (2013.01); *F01D 17/14* (2013.01); *F01D 25/24* (2013.01)

(58) Field of Classification Search
CPC ...... B01J 19/18–22; F01D 1/023; F01D 1/12; F01D 1/14; F01D 1/16; F01D 9/02; F01D 9/06; F01D 25/24; F02C 6/18
See application file for complete search history.

(56) References Cited

U.S. PATENT DOCUMENTS 3,869,220 A * 3/1975 Tayler ....................... F01D 1/12
                                                           415/57.1
4,441,855 A * 4/1984 Tayler ................... F04D 23/008
                                                           415/58.7
(Continued)

FOREIGN PATENT DOCUMENTS

WO         2015138534 A1    9/2015

OTHER PUBLICATIONS

International Search Report for PCT/FI2023/050117, mailed Jun. 14, 2023, 5 pages.
(Continued)

*Primary Examiner* — Christopher R Legendre
(74) *Attorney, Agent, or Firm* — Nixon & Vanderhye

(57) ABSTRACT

An insert assembly to be used in a rotary apparatus for thermally treating fluids is configured for installation into the rotary apparatus including a rotor with a plurality of rotor blades arranged into a rotor blade cascade, stationary vanes arranged into essentially annular vane cascades adjacently disposed with regard to the rotor blade cascade to form a stator-rotor-stator arrangement, and a casing, in which a duct is formed with at least one inlet and at least one outlet, said casing enclosing the stator-rotor-stator arrangement inside the duct. When positioned inside the duct, the insert assembly forms a guideway to direct a stream of fluidic medium entering the duct through the at least one inlet towards the stator-rotor-stator arrangement and to further direct the
(Continued)

stream of fluidic medium exiting the stator-rotor-stator arrangement towards the at least one outlet, respectively.

27 Claims, 7 Drawing Sheets

(51) Int. Cl.
*F01D 17/14* (2006.01)
*F01D 25/24* (2006.01)

(56) References Cited

U.S. PATENT DOCUMENTS

| | | |
|---|---|---|
| 7,232,937 B2 | 6/2007 | Bushuev |
| 9,234,140 B2 | 1/2016 | Seppala et al. |
| 9,494,038 B2 | 11/2016 | Bushuev |
| 10,744,480 B2 | 8/2020 | Xu et al. |
| 12,325,830 B2 * | 6/2025 | Karpov .................... C10G 9/00 |
| 2014/0093407 A1 | 4/2014 | Calkins et al. |
| 2025/0188841 A1 * | 6/2025 | Karpov .................. F01D 25/24 |
| 2025/0243780 A1 * | 7/2025 | Xu ......................... F01D 25/10 |

OTHER PUBLICATIONS

Written Opinion of the ISA for PCT/FI2023/050117, mailed Jun. 14, 2023, 8 pages.
Search Report, issued in Finnish Patent Application No. 20225189 dated Aug. 18, 2022.

* cited by examiner

INSERT ASSEMBLY FOR A ROTARY APPARATUS, RELATED APPARATUS AND METHOD

CROSS-REFERENCE TO RELATED APPLICATIONS

This application is the U.S. national phase of International Application No. PCT/FI2023/050117 filed Mar. 1, 2023, which designated the U.S. and claims priority to FI 20225189 filed Mar. 2, 2022, the entire contents of each of which are hereby incorporated by reference.

FIELD OF THE INVENTION

The present invention generally relates to the field of rotary turbomachines having replaceable, insertable liner components inside a pressure casing. In particular, the invention concerns an insert assembly for a rotary bladed apparatus, related apparatus, method and uses.

BACKGROUND

In the field of turbomachinery, a range of solutions exists which involves provision of a non-hermetic liner inside a hermetically sealed casing. Such solutions are widely used in the design of aircraft engines, for example. Exemplary hydraulic turbochargers, turbines or pumps comprising replaceable, modular volute-type inserts inside the housing are described in US 2014/0093407 A1 (Calkins et al). The aircraft engines or other turbomachines do not typically encounter high temperature differences in the pressure casing and across the individual blade rows.

Rotary reactor devices comprising a rotor disk with associated blade cascade disposed between the rows of stationary vanes arranged on essentially ring-shaped supports and enclosed within a toroid-shaped casing are disclosed in U.S. Pat. No. 9,494,038 (Bushuev) and U.S. Pat. No. 9,234,140 (Seppälä et al). Mentioned reactors convert hydrocarbon feedstocks into light olefins via thermo(chemical) cracking. Feedstock-containing process fluid enters the interior of the apparatus via inlet(s) and passes through the stator and rotor cascades several times according to essentially spiral trajectory prior to exiting the reactor. Upon propagation inside the reactor, the process fluid is heated by at least 500 degrees Celsius (° C.) through formation of a series of shockwaves, therefore, a temperature difference is created between the inlet- and discharge sections. Due to reactor configuration, this difference results in a sharp temperature gradient, which causes thermal stresses and deformations in the reactor casing and in a rotor shaft body. Thermal stresses markedly decrease a lifetime of the reactor impose extra expenses associated with maintenance and repair.

This problem can be dealt with by replacement of the entire casing and/or by having the casing produced from custom high-temperature materials and alloys. However, any one of these options is costly and does not eliminate the issue of temperature gradient formation.

Additionally, the rotary reactor devices described herein above tend to undergo local coking due to non-uniform velocity profiles originating from the fact that velocity of a fluid flow propagating through the reactor decreases at a wall region. However, conventional methods of decoking, such as steam and/or air decoking, for example, shorten the lifetime of the device.

Recently it has been demonstrated that the rotary bladed device(s) may be rendered with a (pre) heater functionality capable of providing significantly higher amounts of (thermal) energy into high temperature heat intensive processes and associated equipment. Such processes include for example non-metallic minerals processing (mostly cement), production of hydrogen from natural gas, incineration of end-of-life plastics, chemical industry high-temperature heat processes (e.g. core processes to crack hydrocarbons into bulk chemicals and to transform limestone to cement clinker), iron and steel production (e.g. core processes to melt and form steel) and utilization of thus produced off-gases as a feedstock for bulk chemicals. Most of the above-mentioned processes require high- and extremely high temperature, such as within a range of about 850° C. to about 1600° C. To effectively withstand high temperature gradients of about 500° C.-1500° C., the rotary bladed device(s) still have a room for improvement.

In this regard, an update in the field of improving efficiency of rotary bladed devices employed in thermal processing of fluids is still desired in view of addressing challenges associated with capability of said devices to reliably bear high-temperature stresses, in particular, upon being used in related high- and extremely high temperature industrial applications.

SUMMARY OF THE INVENTION

An objective of the present invention is to solve or to at least alleviate each of the problems arising from the limitations and disadvantages of the related art. The objective is achieved by various embodiments of an insert assembly for use in a rotary apparatus for thermally treating fluids, related rotary apparatus and method.

In embodiment, the insert assembly is provided for use with the rotary apparatus for thermally treating fluids, said apparatus comprising a rotor comprising a plurality of rotor blades arranged over a circumference of a rotor hub mounted onto a rotor shaft and forming a rotor blade cascade; a plurality of stationary vanes arranged into essentially annular vane cascades adjacently disposed with regard to the rotor blade cascade such, as to form a stator-rotor-stator arrangement, and a casing, in which a duct is formed with at least one inlet and at least one outlet, said casing enclosing the rotor blade cascade and the stationary vane cascades inside the duct, wherein, the insert assembly is shaped and positioned inside the duct in such a way that a guideway or guideways is/are formed that direct(s) a stream of fluidic medium entering the duct through the at least one inlet towards the stator-rotor-stator arrangement and further direct(s) the stream of fluidic medium exiting the stator-rotor-stator arrangement towards the at least one outlet, respectively.

In embodiment, the insert assembly is shaped and positioned inside the duct in such a way that, by virtue of the insert assembly, temperature distribution inside the casing is equalized and thermal stresses generated in the casing during propagation of thermally treated fluidic media through the duct are reduced.

In embodiment, the insert assembly is configured to direct the stream of fluidic medium entering the duct through the at least one inlet towards a stationary guide vane cascade of the stator-rotor-stator arrangement, and to further direct the stream of fluidic medium exiting a stationary diffuser vane cascade of the stator-rotor-stator arrangement towards the at least one outlet, respectively, wherein the stationary guide vane cascade is disposed upstream of the rotor blades and the stationary diffuser vane cascade is disposed downstream of the rotor blades.

In embodiment, the insert assembly comprises a number of insert units.

In embodiment, the insert units are arranged inside the duct of the apparatus such as to adjoin any one of the inlet and the outlet. In embodiment, the insert unit(s) adjoining any one of the inlet and the outlet are rendered with a shape adjusted to optimize the stream of fluidic media propagating through the insert assembly.

In embodiment, the insert assembly is configured to attach to any one of the stationary vane cascades.

In embodiment, all insert units in the insert assembly are spaced apart from one another.

In embodiment, in the insert assembly, the insert units adjoin one another inside the duct such as to form a shell liner inside the casing. In embodiment, the insert units adjoin one the another in a non-hermetic manner to allow circulation of essentially gaseous media through gaps remaining along the areas where the insert units adjoin.

In embodiment, the shell liner formed inside the casing essentially encompasses the stator-rotor-stator arrangement.

In embodiment, the shell liner is formed with one or more insert units positioned adjacent to the stationary guide vane cascade and with one or more insert units positioned adjacent to the stationary diffuser vane cascade.

In embodiment, the insert assembly at least partly defines a vaneless space formed in the duct between an exit from the stator-rotor-stator arrangement and an entrance thereto, thereby the vaneless space is defined by at least a part of a duct volume between an inner surface of the insert assembly and an outer surface of a flow-shaping device arranged inside the casing.

In embodiment, in the insert assembly, the insert units are installed in the casing such as to enable their movement relative to one another and/or relative to the casing.

In embodiment, a number of through-holes is arranged on the surfaces of at least some of the insert units of the insert assembly for supplying additional gaseous media into the duct. In embodiment, surfaces of the insert units have profiles configured to optimize flow velocity of the fluidic medium propagating through the duct.

In embodiments, the insert units have a reduced wall thickness relative to the casing, and optionally at least some of the insert units are made of a material different from the material of the casing.

In embodiment, in the insert assembly, any one of the insert units is composed, partly or fully, of a material capable of being flexed or bent without breaking. In embodiment, in the insert assembly, any one of the insert units is composed of portions made of the same material or different material. In embodiment, in the insert assembly, any one of the insert units is composed, partly or fully, of a ceramic material.

In embodiment, the insert assembly is configured replaceable.

In another aspect, a rotary apparatus for thermally treating fluids is provided. In embodiments, the apparatus comprises the insert assembly configured in accordance with any one of the embodiments defined hereinabove.

In embodiment, the apparatus further comprises selected vanes within the stationary vane cascades modified to form attachment points to the insert assembly. In embodiment, in said apparatus, the insert assembly is provided in the form of the shell liner inside the casing and a duct volume formed between said shell liner and the casing is filled with an insulation material.

In embodiment, the apparatus is configured as a reactor for heat-assisted conversion of feedstocks in fluidic media, optionally, as a reactor for thermal- or thermochemical cracking of hydrocarbon-containing feedstocks.

In another aspect, a method for reducing thermal stresses and related deformations in a rotary apparatus during thermal treatment of fluids is provided.

In embodiment, in said method, conditions for thermally treating the fluidic medium inside the duct of the rotary apparatus are established when an amount of thermal energy is imparted into the stream of fluidic medium by virtue of series of energy transformations occurring when said stream of fluidic medium successively passes through blade/vane rows forming the stator-rotor-stator arrangement and through a vaneless space, respectively, while propagating within the duct between the at least one inlet and at least one outlet.

In embodiment, in said method, the stream of fluidic medium successively passes through blade/vane rows forming the stator-rotor-stator arrangement and through the vaneless space, respectively, in accordance with an essentially helical flow path.

In embodiment, in said method, a process of thermal treatment involves raising the temperature of the fluidic medium by at least about 400 degrees Celsius (° C.).

In embodiment, in said method, the process of thermal treatment involves heat-assisted conversion of feedstocks in fluidic media, optionally, thermal- or thermochemical cracking of hydrocarbon-containing feedstocks.

The utility of the present invention arises from a variety of reasons depending on each particular embodiment thereof. At first, the insert assembly proposed hereby enables rendering temperature distribution inside a rotary device for thermally treating fluids more uniform, thereby thermal deformations of a pressure casing and a rotor shaft can be avoided or at least significantly reduced. Rotary devices which benefit the most from the invention operate at relatively high temperatures, such as temperatures generally exceeding 500° C., for example up to 900-1300° C., and are typically subjected to severe thermal stresses due to formation of high temperature gradient between the inlet- and discharge sections. By having the insert assembly, according to the inventive concept installed inside the rotary device, the temperature gradient is smoothened, and the equipment lifetime is increased.

Additionally, provision of the insert assembly (made replaceable) eliminates the need in replacing the entire pressure casing of the rotary device. The pressure casing is typically replaced at the end of the device's lifetime or when conditions of a thermal treatment process require modification. For example, in processes of thermal conversion, such as steam cracking, changes in residence time (a time period needed to entirely exchange the volume of the rotary device, in which a process of thermal conversion takes place) typically require replacement of the entire pressure casing/pressure shell. Provision of the insert assembly allows for avoiding the system's (frequent) shut down periods associated with replacement of pressure shell(s) and related expenses, accordingly. Additionally, making temperature distribution more uniform in (thermo)chemical conversion rotary reactors markedly reduces coking and therefore improves aerodynamic performance of rotating blades.

Furthermore, provision of the insert assembly in the form of a shell liner inside an internal cavity of the rotary apparatus, enables to create a layer or layers of additional (thermal) insulation and to reduce heat losses in industrial scale, accordingly. At the same time, the need in manufacturing the entire machinery from special heat-resistant alloys is eliminated. Total costs associated with manufacturing, maintenance and repair are reduced, while a process of replacement of parts is greatly facilitated.

The expression "a number of" refers hereby to any positive integer starting from one (1), e.g. to one, two, or three. The expression "a plurality of" refers hereby to any positive integer starting from two (2), e.g. to two, three, or four. The terms "first" and "second", are used hereby to merely distinguish an element from another element without indicating any particular order or importance, unless explicitly stated otherwise.

The term "gasified" is utilized herein to indicate matter being converted into a gaseous form by any possible means.

Different embodiments of the present invention will become apparent by consideration of the detailed description and accompanying drawings.

DETAILED DESCRIPTION OF THE EMBODIMENTS

Figure 1A:
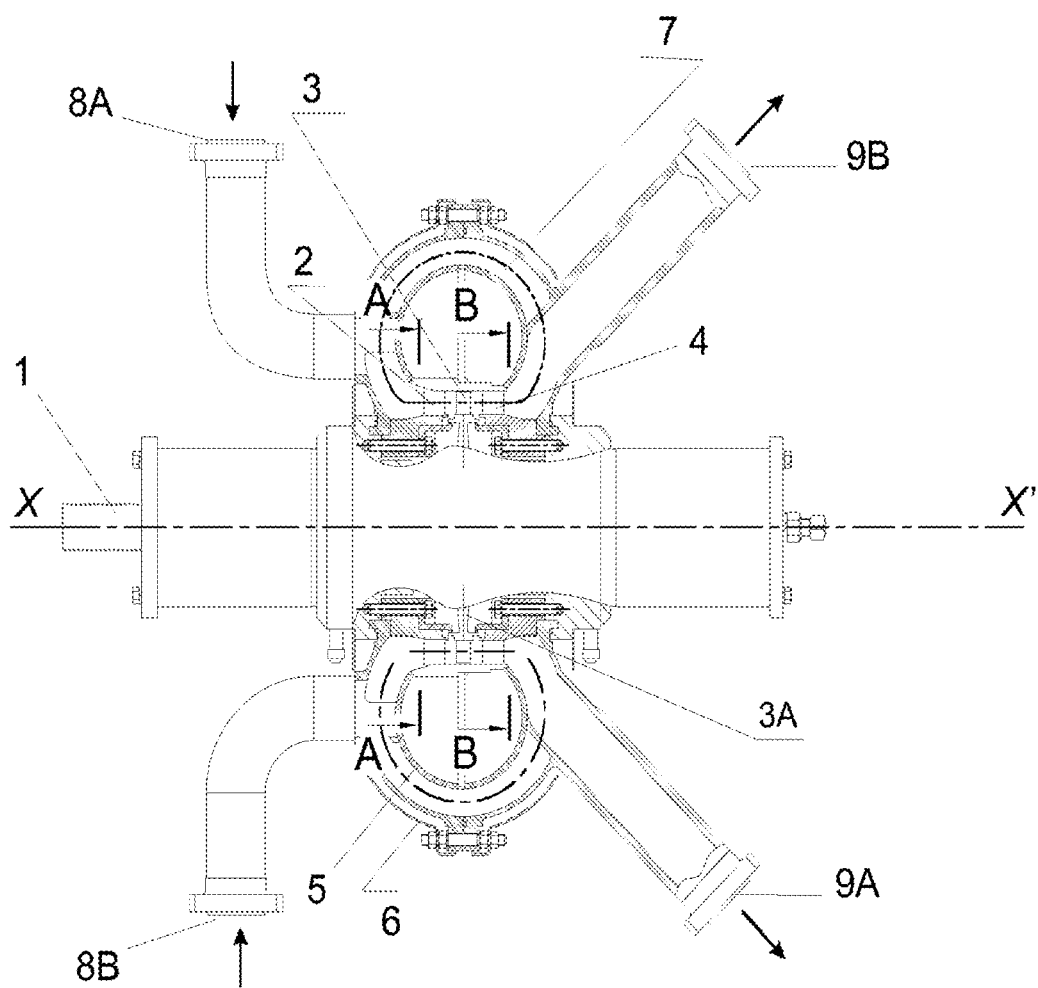
FIG. 1A is a vertical crosscut of an exemplary apparatus 100 which accommodates an insert assembly.

Detailed embodiments of the present invention are disclosed herein with the reference to accompanying drawings. The same reference characters are used throughout the drawings to refer to the same members, where:

1—a rotor shaft;
2—a stationary guide vane cascade;
3—rotor blade cascade; 3A—a rotor hub/rotor disk;
4—a stationary diffuser vane cascade;
5—a flow-shaping device;
6—a gas casing; 6A, 6B—half-shells of the gas casing, respectively;
7—a vaneless space,
7A—a cavity formed between an insert assembly 10 and the flow-shaping device 5;
7B—a cavity formed between an insert assembly 10 and the gas casing 6;
8, 8A, 8B—an inlet (apparatus 100);
9, 9A, 9B—an outlet (apparatus 100);
10—an insert assembly;
10-1, 10-2, 10-3, 10-4—insert units or segments
$10_{in}$—insert units installed adjacent to the stationary guide vane cascade (an inlet insert module);
$10_{out}$—insert units adjacent to the stationary diffuser vane cascade (an outlet insert module);
11—a flowguide arranged in the insert assembly;
12—local expansions of the gas casing 6 to receive the insert assembly;
13—attachment points (designates sites where the insert assembly may be attached to the stationary component and to the gas casing);
14—a site where the insert units adjoin modified stationary vanes (inlet and outlet areas);
15—gaps formed along the areas where the insert units adjoin within the insert assembly;
16—a clearance to accommodate thermal expansion;
17, 17A—fixing pins;
18—a connection flange;
20A, 20B—a bearing block.

Figure 2:
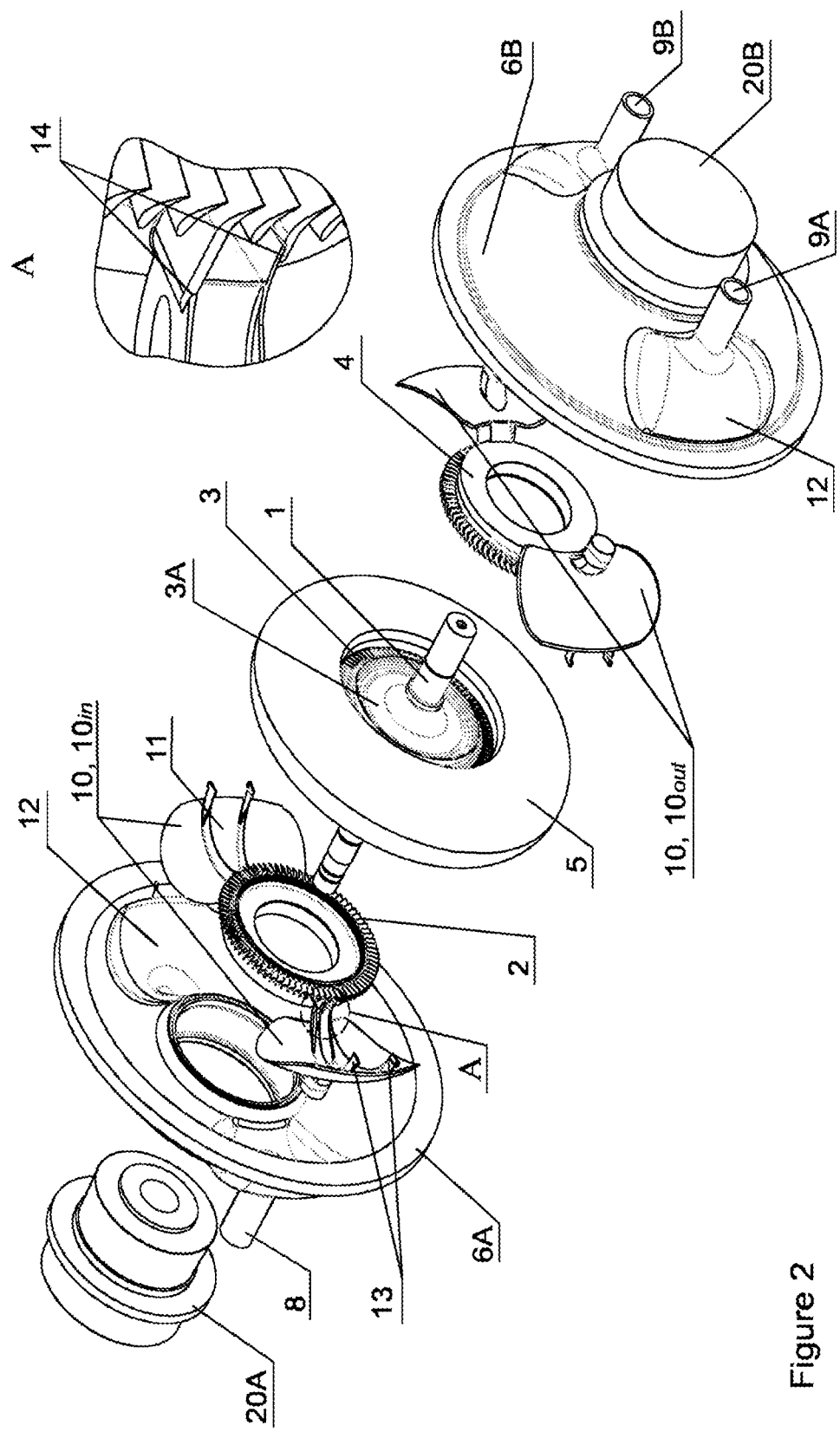
FIG. 2 is an exploded view of the apparatus 100 comprising the insert assembly 10, according to an embodiment.
Figure 3:
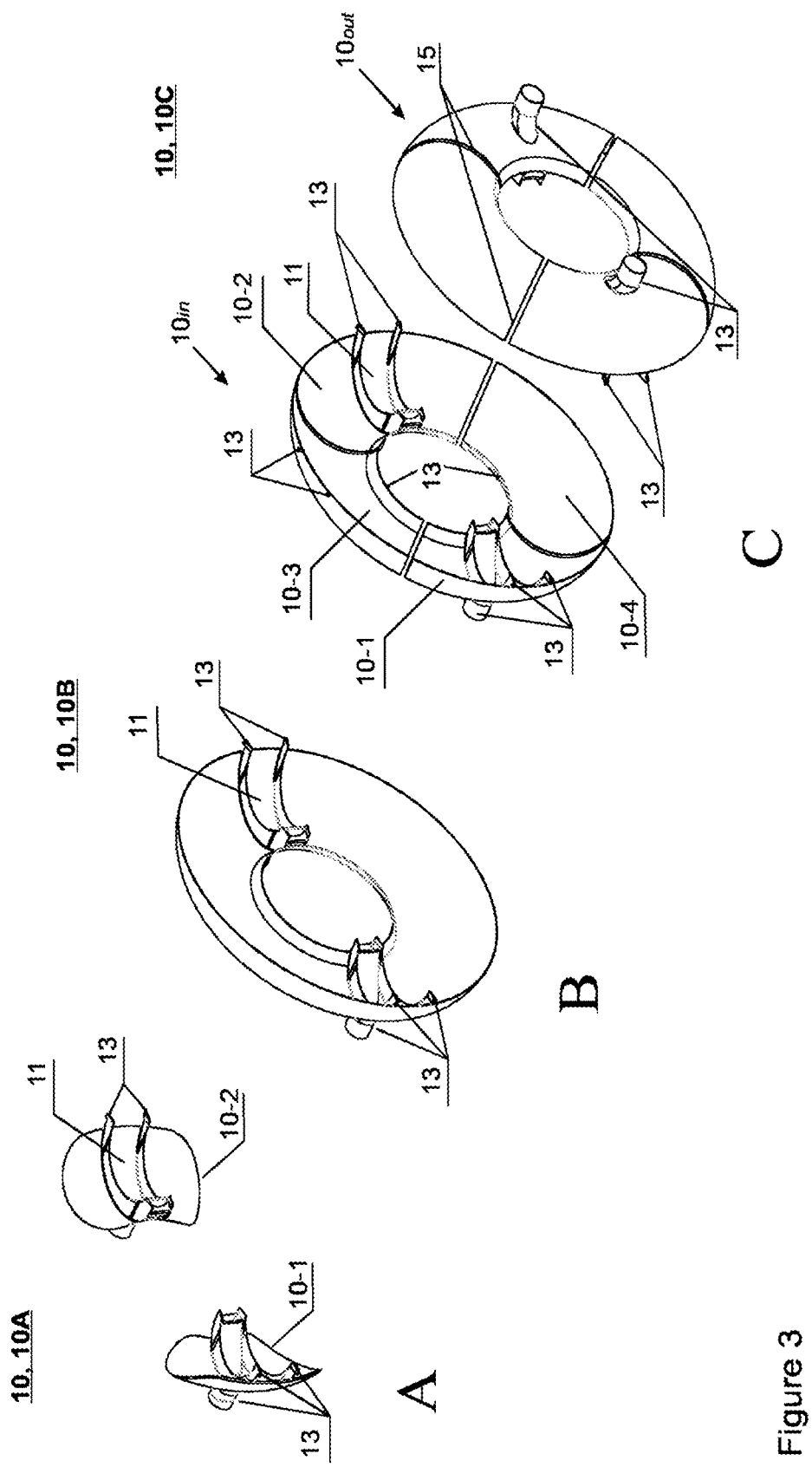
FIG. 3 shows, at A, B and C, the insert assembly 10 (10A, 10B, 10C, respectively), implemented in accordance with the embodiments.
Figure 4:
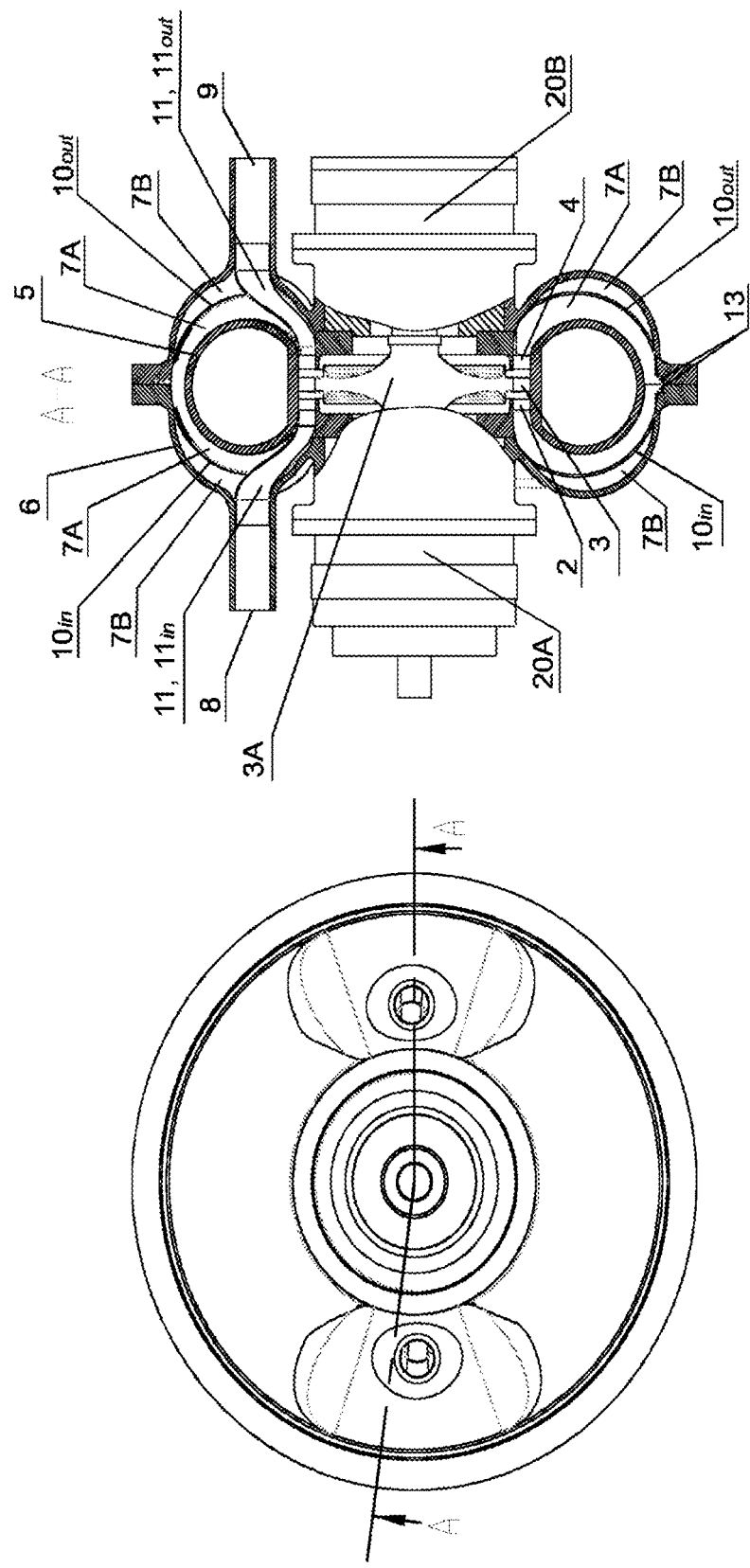
FIG. 4 shows a crosscut of an exemplary apparatus 100, comprising the insert assembly according to the embodiment, through inlet- and outlet branch pipes and through attachment points of the insert assembly.

FIGS. 2 and 3 illustrate an insert assembly 10 according to the embodiments. The insert assembly 10 is configured for use with a rotary bladed apparatus 100 (rf. FIGS. 1A, 4).

The insert assembly 10 is positioned inside the apparatus 100. When positioned in the interior of the apparatus, the insert assembly 10 forms a guideway or guideways between an interior of said apparatus and related inlet- and outlet arrangement through which a stream of fluidic medium enters the apparatus (interior thereof) and is discharged therefrom, respectively.

The most benefits can be derived from the insert assembly, when the latter is installed in the rotary bladed apparatus 100 realized in accordance with the following description. The apparatus 100 is preferably configured for thermally treating fluids. In some instances, the apparatus is configured for treating feedstocks in process fluids through any one of thermal or thermochemical treatment process. The thermal treatment process may or may not be accompanied with thermal and/or chemical conversion of feedstocks into desired products. Conversion may include reactions of thermal and/or chemical degradation occurring while the feedstock containing process fluid propagates through the apparatus. In some instances, the apparatus 100 is configured as a reactor for thermochemical cracking of hydrocarbon-containing feedstocks. In some instances, the apparatus 100 is adapted for steam cracking of hydrocarbon-containing feedstocks to produce lower olefins (ethylene, propylene, etc.).

The apparatus 100 can be adapted to implement the stream of fluidic medium, between an inlet and an outlet, along a flow path established in accordance with essentially helical trajectory formed within an essentially toroid-shaped casing, wherein the fluidic flow successively passes through the rows of stationary guide vanes, rotor blades and stationary diffuser vanes. Devices of the kind are discussed in detail in U.S. patents U.S. Pat. No. 9,494,038 to Bushuev and U.S. Pat. No. 9,234,140 to Seppälä et al incorporated herein by reference. Alternatively, the apparatus 100 may adopt configurations outlined in U.S. Pat. No. 10,744,480 to Xu & Rosic and U.S. Pat. No. 7,232,937 to Bushuev.

Exemplary apparatus 100 configured to accommodate the insert assembly 10 is shown on FIG. 1A. The apparatus 100 comprises a rotor system, hereafter, a rotor, comprising a rotor shaft 1 positioned along a horizontal (longitudinal) axis X-X' and a rotor unit comprising at least one row of rotor blades arranged over a circumference of a rotor disk or a rotor hub 3A mounted onto the rotor shaft. A plurality of rotor blades (also referred to as working blades) arranged into at least one blade row establish a rotor blade assembly or a rotor blade cascade 3.

The apparatus utilizes a drive engine. In preferred configurations, the apparatus utilizes electric motor(s) as a drive engine. Additionally or alternatively the apparatus can be directly driven by gas- or steam turbine, for example, or by any other suitable drive engine device. For the purposes of the present disclosure, any appropriate type of electric motor (i.e. a device capable of transferring energy from an electrical source to a mechanical load) can be utilized. Suitable coupling(s) arranged between a motor drive shaft and the rotor shaft, as well as various appliances, such as power converters, controllers and the like, are not described herewith. Bearing assemblies with related shaft end seals are denoted with reference numerals 20A, 20B (rf. FIG. 2 and FIG. 4 right image).

The apparatus 100 further comprises a stationary component. Stationary component is represented by a plurality of stationary (stator) vanes arranged into rows. A row of stationary vanes forms a stationary vane cascade. In embodiment, stationary vane cascades 2, 4 are provided as essentially annular assemblies at both sides of the working blade row (the working blade cascade 3). A first stationary vane cascade 2 is disposed upstream of the rotor blade cascade 3 and a second stationary vane cascade 4 is disposed downstream of the rotor blade cascade.

The term "cascade" (a crown of blades/vanes) refers to an ensemble of (working) blades or (stationary) vanes installed over a periphery of a rotor disk/rotor hub or on a ring-shaped support or a casing, respectively.

The terms "upstream" and "downstream" refer to spatial and/or functional arrangement of structural parts or components with relation to a predetermined part- or component, hereby, the at least one rotor blade row/-cascade, essentially in a direction of fluidic flow throughout the apparatus (along the axis X-X', as shown on FIG. 1A, for example).

The cascade arranged upstream of at least one row of rotor blades comprises a plurality of stationary guide vanes. Stationary guide vanes can be configured as stationary nozzle guide vanes (NGV). In embodiments, these vanes form a first stationary vanes cascade 2, also referred to as a stationary guide vane cascade. The cascade arranged downstream of at least one row of rotor blades comprises a plurality of stationary diffuser vanes. These vanes form a second stationary vane cascade 4, also referred to as a stationary diffuser cascade.

Stationary vane cascades 2, 4 adjacently disposed with regard to the row of rotor blades 3 form a stator-rotor-stator arrangement 2, 3, 4. In the stator-rotor-stator arrangement, the rotor blade cascade 3 is positioned between the stationary guide vane cascade 2 and the stationary diffuser vane cascade 4.

The apparatus 100 comprises a casing 6 (also referred to as a gas casing or a pressure casing), in where an interior passageway is established in the form of a duct between at least one inlet 8 and at least one outlet 9. The casing 6 is hermetically (gas-tight) sealed.

In present disclosure, the gas casing 6 is generally referred to as an apparatus casing. Nevertheless, the apparatus structure 100 can be further enclosed into a separate external housing (not shown).

FIG. 1A shows the apparatus with two inlets 8A, 8B and two outlets 9A, 9B; other configurations may be conceived where appropriate. The inlet(s) and outlet(s) comprise related orifices or ports in the casing 6 and a number of branch pipes, sleeves or manifolds associated with each said orifice/port.

In configuration of FIG. 1A, the casing 6 is configured to substantially fully enclose the periphery of the rotor disk with working blades 3 assembled thereon and stationary vane cascades 2, 4 that adjoin the rotor blades and together form the stator-rotor-stator arrangement 2, 3, 4. The casing 6 has an essentially toroid shape (a "doughnut" shape) in three-dimensional configuration, whereby the rotor system (1, 3A, 3) with related bearing assemblies may be viewed as filling up an aperture defining an opening in the central part of the essentially toroid shape. The toroid-shaped structure thus forms a gas-tight gas casing. At its meridional cross-section, the gas casing 6 is essentially ring-shaped.

A flow-shaping device (a flow-guiding device) 5 is arranged inside the gas casing 6. The flow-shaping device 5 can be configured as an internal stationary ring-shaped structure and it accounts for establishing an essentially annular duct inside the casing 6. The device 5 is fixed in the gas casing 6 with appropriate fixtures (not shown). In some configurations, the flow-shaping device 5 is an annular, essentially hollow structure, such as a hoop, for example.

The interior volume of the apparatus 100 is defined as a space established between the gas casing 6 (an outer "doughnut") and the internal flow-shaping device 5 (an inner "doughnut").

A substantially annular passageway/duct is thus formed between an inner surface of the gas casing 6 and an outer surface of the flow-shaping device 5. This duct has a ring-shaped meridional cross-section, accordingly. The flow-shaping device 5 may adjoin the tips of rotor blades (a gap is formed therebetween enabling unhindered rotation of the rotor) and the peripheral portions of stator vanes, in an event the stator vanes are provided on bearing blocks constituting a bearing system of the rotor (not shown).

Alternatively, the stator cascades may be assembled on the flow-shaping device 5 in a manner to adjoin the rotor blades 3. Said stator vanes may thus be mounted on the flow-shaping device and/or connected thereto by means of auxiliary arrangements, such as rings, brackets, and the like (not shown). The above-mentioned features are discussed in more detail in patent documents by Bushuev (U.S. Pat. No. 9,494,038 B2) and Seppälä et al (U.S. Pat. No. 9,234,140) referenced hereinabove.

In the gas casing 6 (in the duct thereof), the cascades 2, 3, 4 adjoin each other in such a way that a vaneless space 7 is created between an exit from the stator-rotor-stator arrangement (viz. the exit from the diffuser cascade 4) and an entrance into said arrangement (viz. the entrance into the stationary (nozzle) guide vane cascade 2). The vaneless space is formed between an inner surface of the gas casing 6 and the outer surface of the flow-shaping device 5.

In the apparatus 100, sequential rows of stationary guide vanes 2, rotor blades 3 and stationary diffuser vanes 4 (together forming the stator-rotor-stator arrangement) establish an energy transfer stage, also referred to as an elemental stage or a working stage (hereafter, a stage).

The function of the elemental stage is to impart mechanical energy to fluid and to convert the mechanical energy into thermal energy. The stage is thus configured to mediate a complete energy conversion and energy transfer cycle. The fluidic medium undergoes heating as it flows through the at least one stage formed with successive rows 2, 3 and 4 (the stator-rotor-stator arrangement 2, 3, 4) and the vaneless space 7.

During the energy conversion/energy transfer cycle, the stationary guide blade row(s) 2 disposed upstream the rotor blades 3 prepare the required flow conditions at the entrance of the rotating blade row (cascade). In the rotor blade row, mechanical energy of the shaft and rotating blades is transferred to fluidic stream. In at least the part of each rotor blade row 3 the flow of fluidic medium can reach a supersonic flow condition.

The stationary blade row(s) (diffuser 4) disposed downstream the rotor blades 3 convert(s) mechanical energy of the fluidic medium into its thermal energy. The fluidic flow exits the rotor blades 3 and enters the diffuser 4 at supersonic speed. If the flow upstream of the diffuser is supersonic, the kinetic energy of the fluidic stream is converted into internal energy of the fluid through a system of multiple shocks and viscous mixing and dissipation. The flow dissipates its kinetic energy into internal energy of the fluidic stream propagating through the apparatus and thus provides the amount of thermal energy to the fluid. An increase in the internal energy of the fluid results in a rise of fluid temperature. In some instances, increased temperatures promote thermal or thermochemical degradation of feedstock species and conversion thereof into desired products. In the apparatus 100 configured for thermal and/or chemical conversion of feedstocks, a majority of chemical reaction(s) that trigger conversion of feedstock(s) into target products occur in the vaneless space.

Figure 1B:
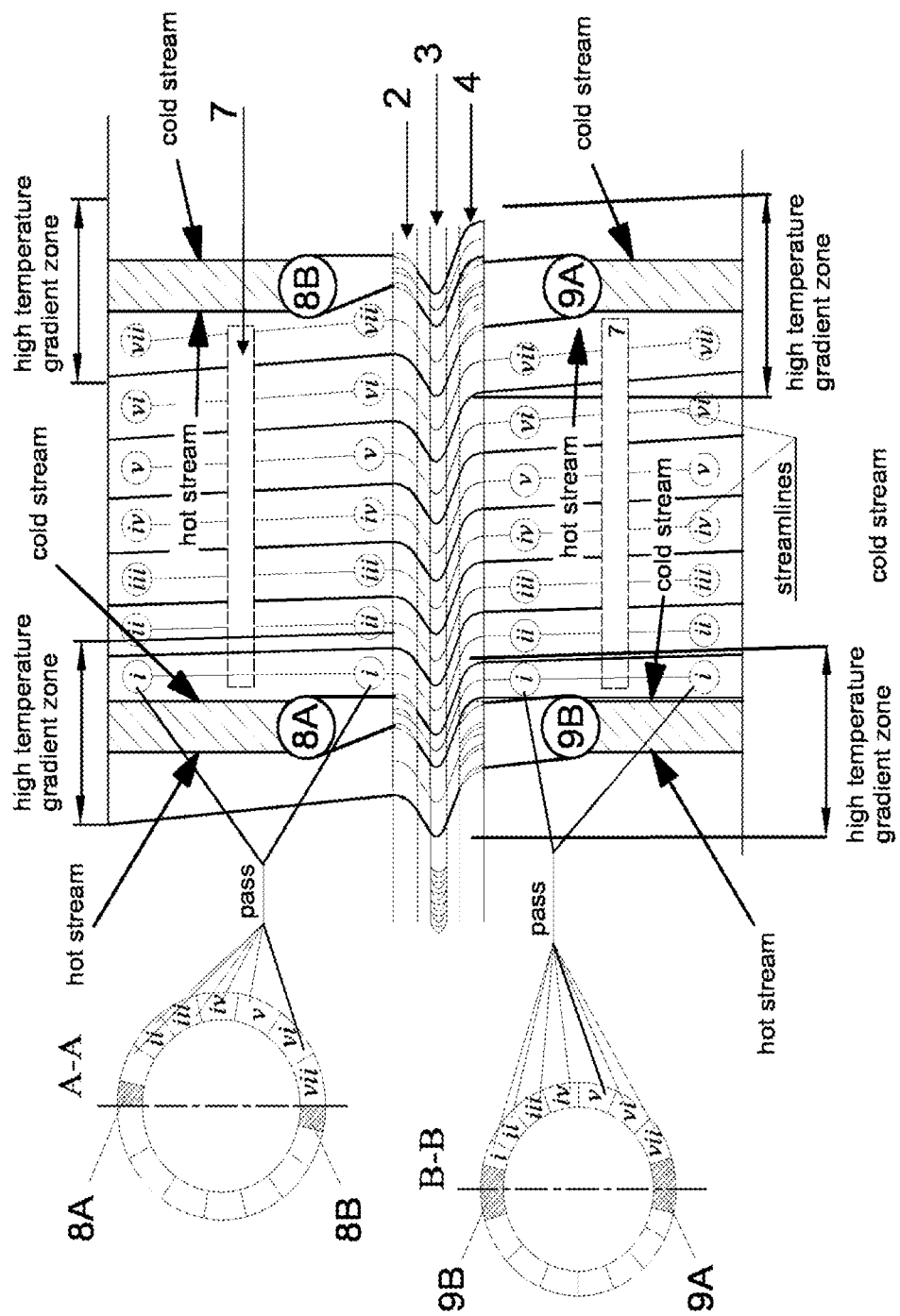
FIG. 1B shows cross-sectional views across lines A-A and B-B designated on FIG. 1A and illustrates a flow diagram for streamline passageways through the apparatus 100.

FIG. 1B illustrates cross-sectional views across lines A-A and B-B designated on FIG. 1A. Cross-sectional area across the line A-A is located at the entrance (inlet) to the (nozzle) guide vane cascade 2, while the cross-sectional area across the line B-B is located at the exit from the diffuser cascade 4. Overall, crosscuts A-A and B-B depict the events occurring at the inlet to- and exit from the stator-rotor-stator arrangement.

Entrance (inlet) to the blade/vane cascade is generally defined with leading edges of related blades/vanes, whereas the exit from the cascade is defined with trailing edges of said blades/vanes. The entrance and exit are defined in the direction of fluid flow.

Locations at which the fluidic stream enters and exits the interior of the apparatus 100 (the duct) are indicated on the images depicting crosscuts A-A and B-B. Additionally, the fluidic streamlines passing through the stator-rotor-stator arrangement 2, 3, 4 generally following the helical pathway are indicated as separate numbered sectorial areas or sectors by roman numerals i-vii. A flow diagram illustrative of streamline passageways through the apparatus is shown on the right. FIG. 1B shows streamlines travelling between a first inlet 8A and a first outlet 9A. Streamlines travelling between the second inlet 8B and the second exit 9B are not shown.

In operation, a stream of fluidic medium, such as feedstock-containing process fluid, for example, enters the apparatus through the inlet 8 (8A) and arrives at the stationary guide vane cascade 2. Some stationary vanes located at the entrance areas can be modified to provide connection between the vanes (2) and the insert assembly (rf. FIG. 2 and reference numeral 14).

The fluidic stream propagates through the stator-rotor-stator arrangement 2, 3, 4, which means, in practice, that the stream sequentially propagates through the stationary guide vanes 2, through the rotor blades 3 and through the stationary diffuser vanes 4; thereafter the stream exits the cascade(s) at a sector (i) of the diffuser cascade (crosscut B-B), and flows "upwards" through the vaneless space 7. The flow enters the vaneless space after it has exited the stationary diffuser vane cascade 4.

Each time when the process fluid propagates through the stator-rotor-stator cascades, temperature of the process stream rises optionally promoting chemical reaction(s) in the vaneless space arranged downstream of the cascades, as viewed in a direction of fluid flow.

After having passed the vaneless space 7, the fluidic stream arrives at a sector (i) of the nozzle guide vane cascade 2 (crosscut A-A) and the above described process is repeated. Namely, the fluidic stream proceeds through the cascades 2, 3, 4, exits at a sector (ii) of the diffuser cascade 4 (crosscut B-B) and continues through the vaneless space 7 towards a sector (ii) of the guide vane cascade 2 (crosscut A-A), generally following the helical pathway. In configuration presented on FIG. 1B the fluidic stream propagates through the cascades eight (8) times to establish 8 stages, accordingly. Configurations with smaller or greater number of stages can be utilized. After having propagated through the stator-rotor-stator cascades one last time (hereby, eighth time), the fluidic stream exits the cascades and proceeds to the outlet 9 (9A) from the apparatus.

Some stationary vanes located at the exit areas (the diffuser cascade 4) can be modified in similar manner as the stationary guide vanes 2, in order to provide connection between the vanes and the insert assembly (rf. FIG. 2 and reference numeral 14).

In the apparatus 100 schematically presented on FIG. 1A and configured to implement the essentially helical fluidic flow (FIG. 1B), the areas where fluidic stream enters the apparatus (8A, 8B) and the areas where fluidic stream exits the apparatus (9A, 9B) lie essentially close to one another. Since the input (feed) stream has significantly lower temperature than the output (product) stream, this difference results in formation of high temperature gradient zones in the areas where the "cold" stream entering the apparatus and the "hot" stream exiting the apparatus lie proximal to one another (rf. FIG. 1B, "high temperature gradient zones"). These are the sites, where occurrence of high thermal stresses in the gas casing 6 is the most common.

We note that definitions of "cold" and "hot" in the present context are relative and are generally used to distinguish the temperature of a fluidic stream (e.g. a feedstock-containing fluid stream) entering the apparatus (t inlet) from the temperature of a fluidic stream (e.g. a product stream) discharged from the apparatus (t outlet), accordingly. In some instances, the fluidic stream temperature at the inlet may be within a range of 300-700° C. and it is classified as "cold", while temperature at the outlet may reach up to 800-1300° C. (or higher) to be classified as "hot". For example, typical temperature distribution in steam cracking processes run in the rotary apparatus 100 depicted on FIG. 1A is within a range of about 500-700° C. at the inlet and within a range of about 800-1000° C. at the outlet.

Overall, thermal stresses tend to occur when the process of thermal treatment conducted in the apparatus 100 involves raising the temperature of the fluidic medium by at least about 400° C. (delta t/$\Delta$t≥400° C.). Hence, having the temperature gradient (difference between fluidic stream temperatures at the inlet and at the outlet generally expressed as delta t ($\Delta$t)) within a range of about 400-1000° C. leads to thermal stresses and related deformations in the pressure casing and in the rotor shaft body. However, the above mentioned delta t value typically leads to thermal stresses when accompanied with relatively high starting temperature (t inlet≥approximately 300° C.). It is noted that the values presented herewith are not intended as limiting, rather they are meant to provide a skilled reader with a deeper understanding of a problem solvable by the present invention in the context of related technological background.

Present invention is based on an observation that a specially designed insert assembled in the casing 6 in a predetermined manner stabilizes/equalizes temperature distribution inside the casing (in the duct) and reduces thermal stresses generated in the casing during propagation of thermally treated fluidic media through the duct. The insert can be provided as a modular solution comprising a number of individual insert units further assembled into a module or modules. In the present disclosure, the insert units/modules are collectively referred to as an insert assembly 10.

The insert assembly 10 is positioned inside the duct formed between an inner surface of the gas casing 6 and an outer surface of the flow-shaping device 5 (rf. FIG. 1A). The insert assembly locating in the vaneless space 7. The insert assembly can be viewed as being positioned in the vaneless space 7. The insert assembly is shaped and positioned in the duct in such a way that a guideway or guideways is/are formed that direct(s) a flow of fluidic medium entering the duct through the at least one inlet 8 towards the stator-rotor-stator arrangement 2, 3, 4 and further directs the flow of fluidic medium exiting the stator-rotor-stator arrangement towards the at least one outlet 9, respectively.

The insert assembly can be configured to direct the flow of fluidic medium entering the duct through the at least one inlet 8 towards the stationary guide vane cascade 2 of the stator-rotor-stator arrangement, and to further direct the flow of fluidic medium exiting a stationary diffuser vane cascade 4 of the stator-rotor-stator arrangement towards the at least one outlet 9, respectively.

In some configurations, the insert assembly comprises a number of separate insert units arranged inside the duct such as to adjoin any one of the inlet 8 and the outlet 9. The insert assembly may be arranged in the duct between the interior surface of the casing 6 and the stationary vanes (vane cascades). In some instances, the insert assembly is positioned between the inlet/outlet of the apparatus and a related stationary vane cascade. The insert assembly can be configured to attach to stationary vane cascades 2, 4. The insert assembly can be connected to stationary vanes and/or to the casing 6 The insert assembly can be further configured to connect the inlet(s) 8 to the stationary guide vane cascade 2 and/or to connect the outlet(s) 9 (e.g. branch pipes thereof) to stationary diffuser vane cascades 4, respectively.

For the insert assembly to guide the fluidic stream in a manner defined above, the insert unit(s) adjoining any one of the inlet and the outlet are rendered with a shape adjusted to optimize the stream of fluidic media propagating through the insert assembly. The insert unit(s) further comprise flowguide(s) 11, such as internal passageway(s)/flow channel(s) (FIG. 2). The insert assembly on the whole and the internal passageways in particular may adopt any suitable form or shape to create a flowpath adapted to direct the fluidic media to- and from the apparatus 100 in a manner, which is the most beneficial from a gas dynamics viewpoint. The insert assembly may thus be viewed as an intermediate component rendered to optimize the fluid flow entering the apparatus 100 (and the stationary guide vane cascade 2) through the inlet(s) 8, and the fluid flow exiting the apparatus 100 (and the stationary diffuser vane cascade 4), as being discharged from the apparatus through the outlet(s) 9.

In order to install the insert assembly, it may be advantageous to increase dimensions of the casing 6. However, the insert assembly may be dimensioned to be fitted into the existing apparatuses 100. The casing 6 may be expanded locally at areas 12 to receive the insert assembly (FIG. 2).

Reference is made to FIG. 2 showing an exploded view of the apparatus 100 comprising the insert assembly 10, according to an embodiment. The insert assembly shown on FIG. 2 comprises a number of insert units or segments arranged inside the duct to adjoin the inlet 8 and the outlet 9. When the apparatus 100 is assembled, the duct is formed between the inner surfaces of the casing components (half-shells) 6A, 6B and the outer surface of the flow-shaping device 5.

The insert units installed adjacent to the stationary guide vane cascade 2 are referred to as inlet insert units or segments ($10_{in}$), and the insert units adjacent to the stationary diffuser vane cascade 4 are referred to as outlet insert units or segments ($10_{out}$). Two or more inlet insert units may be viewed as an inlet insert module; and two or more outlet insert units may be viewed as an outlet insert module.

The inlet insert units contain internal passageways/channels 11 for directing the stream of fluidic medium from the inlet 8 (a related branch pipe or other arrangement) towards the stationary guide vane cascade 2, and the outlet insert units contain internal passageways/channels for directing the stream of fluidic medium from the stationary diffuser vane cascade 4 towards the outlet 8 (a related branch pipe or other arrangement).

The insert units 10 are attached to the casing 6 (the inner surface thereof) at a number of attachment sites by means of any appropriate attachment appliances, such as connectors, placeholders, support plates and the like (not shown). Possible attachment locations are designated on FIGS. 2 and 3 with a reference numeral 13.

The insert units 10 may be attached to the stationary vane cascades through a number of stationary vanes modified accordingly (see dashed circle A and an enlarged portion showing modified stationary vanes at locations 14, FIG. 2). Such attachment mode can be adopted to connect the insert units to the stationary guide vane cascade 2 and to the stationary diffuser vane cascade 4, respectively. Selected stationary vanes modified for being attached to the insert units are preferably located at the vane cascade areas adjoining the apparatus inlet(s) 8 and/or outlet(s) 9.

The reference is made to FIG. 3, which shows, at A, B and C, the insert assemblies 10 implemented in accordance with the embodiments (10A, 10B and 10C, respectively). In all configurations 10A, 10B, 10C, the insert units installed such as to abut the stationary guide vane cascade 2 are referred to as the inlet insert units ($10_{in}$), and the insert units installed such as to abut the stationary diffuser vane cascade 4—as the outlet insert units ($10_{out}$).

View A (FIG. 3) shows, at 10A, the same insert assembly as illustrated on FIG. 2. The insert units designated as 10-1, 10-2 (FIG., 3, A) are spaced apart from one another. In configuration 10A the insert assembly is formed with a number of separate, discrete insert units. View A is a partial view, showing the insert units 10-1, 10-2 disposed next to a half-shell of the casing (rf. 6A, 6B on FIG. 2). Hence, the insert units 10-1 and 10-2 may together form the inlet insert module $10_{in}$ or the outlet insert module $10_{out}$.

View B shows, at 10B, another configuration for the insert assembly. View B is a partial view, showing an individual insert unit configured as a half-shell and generally following the shape of the half-shell of the casing. When the insert assembly 10B is assembled in the apparatus 100, two insert units as shown on FIG. 3, view B, adjoin one another and form a shell liner inside the casing 6. In the apparatus 100, the shell liner 10B locates in the duct between the gas casing 6 and the flow-shaping device 5.

In embodiments, the insert assembly 10B referred to as the shell liner is formed with two or more insert units. In some instances, the insert assembly 10B can be formed with a number of insert modules. The insert assembly 10B shown on FIG. 3 is thus formed with two insert units, wherein each insert unit is positioned adjacent to the related stationary vane cascade (2, 4). In embodiments, the insert assembly 10B may be formed with one or more insert units positioned adjacent to the stationary guide vane cascade 2 and one or more insert units positioned adjacent to the stationary diffuser vane cascade 4.

To compose the shell liner, identical insert units (such as shown at view B, FIG. 3, for example) may adjoin the inlet(s) 8, 8A, 8B and the outlet(s) 9, 9A, 9B. Customizing the inlet insert units/modules ($10_{in}$) to distinguish those from the outlet insert units/modules ($10_{out}$), in terms of interior passageway/channel shape, for example, is not excluded.

Hence, in all configurations (10A, 10B, 10C), all insert units/modules constituting the insert assembly, may be identical or, alternatively, the inlet insert unit/modules may differ from the outlet insert units/modules in terms of at least their dimensions and/or shape.

Furthermore, in the insert assembly 10 (10A, 10B, 10C), the insert units positioned at the opposite sides of the apparatus 100 (viz. a stationary guide vane cascade side and a stationary diffuser van cascade side) may be identical or different in terms of at least a number of insert units, their structure and provision of additional appliances, such as auxiliary apertures (e.g. fluid passages), coatings, catalysts, and the like. In some instances, the insert units positioned at the opposite sides of the apparatus 100 essentially against one another adopt a mirror arrangement.

The insert assembly 10 and all units (segments) and/or modules forming said assembly are preferably configured replaceable.

The reference is made back to FIG. 3, configuration 10, 10C. This insert assembly embodied as 10C is a shell liner similar to that embodied as 10B, but in 10C, the shell liner is formed with a greater number of insert units. In 10C, the shell liner comprises more than one insert units positioned adjacent to the stationary guide vane cascade 2 and more than one insert units positioned adjacent to the stationary diffuser vane cascade 4. In presented configuration, the insert assembly 10, 10C comprises four insert units 10-1, 10-2, 10-3, 10-4 at the inlet side to form the inlet insert module ($10_{in}$), and the same number of insert units (not shown) at the outlet side to form the outlet insert module ($10_{out}$). Whether the insert assembly is composed of multiple insert segments in a manner shown at 10C, all or selected segments (such as 10-1, 10-2) may be configured to guide the stream of fluidic medium to- and from related stationary vane cascades. View C shows the insert assembly, where the insert segments 10-1, 10-2 comprise the flowguides 11, whereas the segments 10-3 and 10-4 are void of them.

In similar manner, configuration 10C may involve for example two or three insert units (segments) adjacent to the stationary guide vane cascade 2 to form the inlet insert module $10_{in}$ and the same or different number of the insert units adjacent to the diffuser vane cascade 4 to form the outlet insert module $10_{out}$. Any suitable configuration may be conceived.

In configurations 10B, 10C, the insert modules $10_{in}$ and $10_{out}$ adjoin one another inside the duct and form a (modular) shell liner inside the casing 6.

Figure 6:
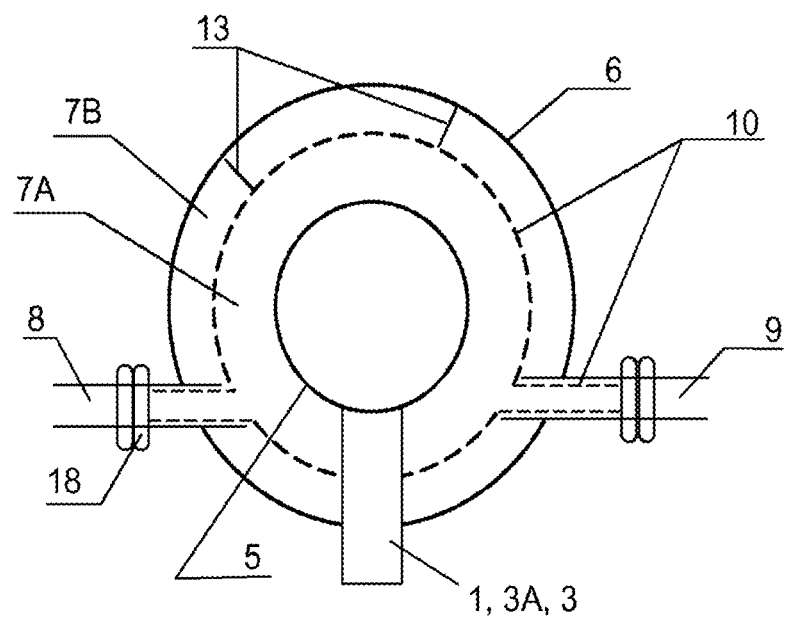
FIG. 6 is a schematic view of the apparatus 100 comprising the insert assembly, according to the embodiment.

The insert assembly in shell liner configurations (10B, 10C) is further schematically visualized on FIG. 6, which shows, at a vertical crosscut, the apparatus 100 with a gas casing 6 constituting the outmost pressure shell (the outer "doughnut"), an intermediate layer represented with the shell liner/the insert assembly 10, and an innermost flow-shaping device 5 (an inner "doughnut").

In the insert assembly provided in shell liner configurations (10B, 10C), all insert units and insert modules (denoted as 10-1, 10-2, 10-3, 10-4 and $10_{in}$, $10_{out}$ respectively) adjoin one the another in a non-hermetic manner to allow circulation of essentially gaseous media through gaps 15 along the areas where the insert units adjoin (rf. FIG. 3, View C). The gaps 15 are thus present between the individual insert units (such as in 10C for example) and/or between the insert modules $10_{in}$, $10_{out}$ when the latter adjoin one another to form the insert assembly 10 (10B, 10C) and to essentially encompass the stationary cascades and the rotor cascade.

Hence, in shell liner configurations, the insert assembly 10, 10B, 10C essentially encompasses the stator-rotor-stator arrangement 2, 3, 4.

By provision of gaps 15 between the insert units, movement of the insert units relative to one another within the insert assembly 10 is enabled in order to compensate for thermal expansions. Additionally or alternatively, the insert units can be configured movable relative to the gas casing 6.

Overall, in configurations 10B, 10C, the gas casing 6 and the insert assembly 10 may be viewed as a double-shell structure of the apparatus 100, in which the gas casing 6 forms an outer shell (the pressure shell), while the insert assembly 10 forms an inner shell. While the casing 6 provides a hermetically sealed, gas-tight shell, the insert assembly forms a non-hermetic internal shell liner which enables circulation of fluids, such as gases, between the individual components (the insert units) the shell liner is composed of.

Having the shell liner 10 (10B, 10C) installed inside the duct, the vaneless space 7 formed between the stationary cascades 2, 4 becomes divided into cavities 7A and 7B, wherein the cavity 7A is formed with a portion of the duct volume between an inner surface (facing the flow-shaping device 5) of the insert assembly 10 and an outer surface of the flow-shaping device, and the cavity 7B is formed with a portion of the duct volume between an outer surface (facing the gas casing 6) of the insert assembly and the inner surface of the gas casing, respectively (rf. FIGS. 4 and 6).

In certain configurations, the insert assembly installed inside the duct of the apparatus 100 defines, at least partly, the vaneless space 7 formed in the duct between the exit from the stator-rotor-stator arrangement 2, 3, 4 (aka the exit from the stationary diffuser vane cascade 4) and the entrance thereto (aka the entrance to the stationary guide vane cascade 2). Hence, the vaneless space 7 may be defined by at least a part of the duct volume between an inner surface of the insert assembly 10 and an outer surface of the flow-shaping device 5 arranged inside the casing. For example, in shell liner configurations (10B, 10C), the vaneless space 7 is defined with a portion of the duct volume that forms the cavity 7A (FIGS. 4 and 6). When the insert assembly is composed of a number of separate, discrete insert units, such as in configuration 10A, for example, the vaneless space 7 is essentially defined with the duct volume between the flow-shaping device 5 and the gas casing 6 and the insert units contribute to formation of said vaneless space to an extent varying in a design-specific manner.

FIG. 4 shows a crosscut of the apparatus 100 comprising the insert assembly 10 and illustrates formation of flowguides 11 by means of the insert units. Fluidguides 11 configured as internal passageways or channels in the insert units/modules at the inlet and at the outlet (denoted as $10_{in}$ and $10_{out}$, respectively) are designated with reference numerals $11_{in}$ and $11_{out}$, respectively.

FIG. 4 shows the cavity 7B formed between the gas casing 6 (the inner surface thereof) and the insert assembly 10. Into the cavity 7B, additional fluidic media, same or different from the stream of fluidic medium propagating through the duct while undergoing the thermal treatment, may be directed. Additional fluidic media is preferably a gaseous media, such as a dilution gas (e.g. steam, inert gas, etc.), a reactive chemical(s) containing gas, and/or other gases, to mediate cooling- or, alternatively, additional heating of the main stream (the stream of fluidic medium subjected to thermal treatment in the apparatus 100). The reactive chemical (reactant) may include any one of a burning gas, such as hydrogen gas, hydrocarbons, oxygen, air, other gas and/or any other appropriate reactive compound, optionally a catalyst.

In some instances, the insert assembly 10 (10A, 10B, 10C) comprises a number of through-holes (not shown) arranged on the surfaces of at least some of the insert units. Through these holes, as well as through the gaps 15 formed at the insert units' junction areas, the above mentioned additional gaseous media may be supplied into the duct of the apparatus 100. The through-holes also enable circulation of the gaseous media between the cavities 7A, 7B formed in the duct in some configurations.

The through-holes and/or other similar appliances (not shown) enable more uniform supply of the fluidic medium into the apparatus and improve uniformity of temperature distribution inside the gas casing 6. Additional gaseous medium can be supplied at a pressure slightly higher (by 0.1 atm to 10 atm for example) than the pressure inside the gas casing, thereby a part of said supplied gas will enter the process and another part will be discharged from the apparatus 100 through apertures made in the gas casing 6 (not shown). By such an arrangement, the total amount of gaseous media entering the process can be reduced.

Additionally or alternatively, the cavity or cavities 7B may contain insulation material, such as a thermal insulation material.

Figure 5:
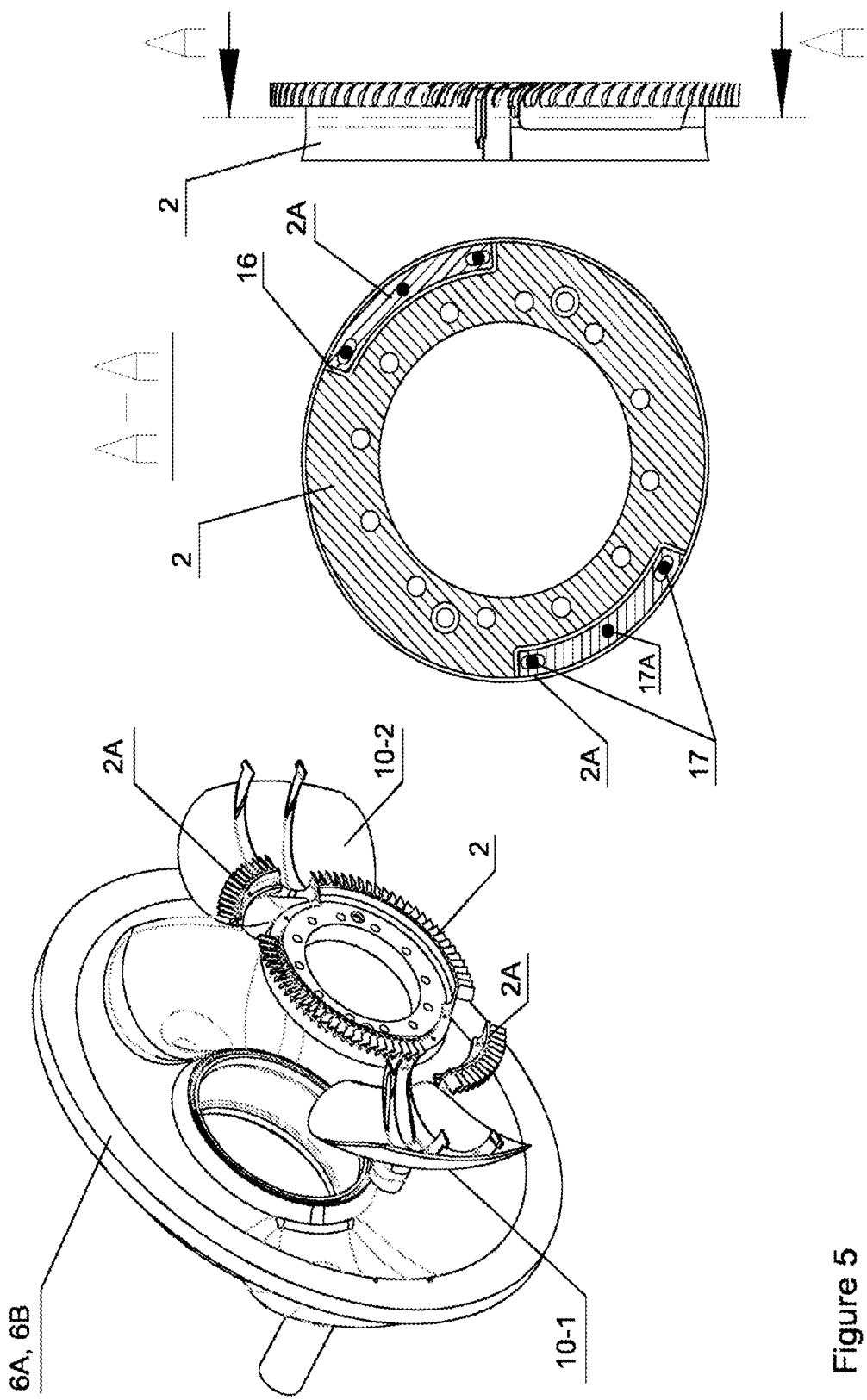
FIG. 5 shows an arrangement of the insert assembly 10 implemented in accordance with the embodiment relative to a stationary vane cascade and a casing.

Reference is made to FIG. 5 showing arrangement of the insert assembly 10 (hereby embodied as 10A) relative to the stationary vane cascade and the casing (rf. the casing half-shell 6A, 6B). The stationary vane cascade shown on FIG. 5 is designated as a stationary guide cane cascade 2; however, the same arrangement is fully applicable to the stationary diffuser vane cascade (not shown).

In some instances, it is advantageous to implement selected portions of the stationary vane cascade, in particular, the portions disposed in the zones of high temperature gradient (rf. FIG. 1B) detachable from the main cascade. On FIG. 5, detachable cascade portions are designated by reference number 2A, while the rest of the cascade (referred to as "main cascade") is designated with reference numeral 2. Clearances 16 are provided between the detachable portions 2A and the rest of the cascade 2 to accommodate thermal expansion. Additionally, fastening of the detachable cascade portions 2A to the rest of the cascade is arranged such, that upon thermal expansion said detachable portions 2A can move relative to the main portion of the stationary vane cascade 2. For example, the detachable portions 2A may comprise elongated apertures at the sites of installation of pins 17, which fix the detachable portions 2A on the cascade 2. Along with the clearances 16, also the elongated apertures accommodate thermal expansion of the detachable portions 2A.

Reference numeral 17A designates a fixing pin installed with a minimal clearance.

Configuration with detachable stationary cascade portions 2A allows for reducing the manufacturing costs, since the rest of the stationary cascades 2, 4 except the detachable portions (2A) may be manufactured from less heat-resistant and therefore less expensive materials.

Similar fixing arrangement may be adopted to hold together the insert units in a manner which enables movement of the insert units relative to one another.

The insert assembly 10 and any of its components can be provided with surfaces (internal and/or external) comprising profiles arranged to optimize flow velocity of the fluidic medium propagating through the duct. The profiles may be of corrugated (waveform) type arranged in an essentially spiral pattern, for example, or of any other suitable shape.

The insert assembly can be manufactured to have a smaller wall thickness relative to the gas casing 6. By virtue of having thinner walls, the insert units are thus significantly less rigid than the gas casing. Additionally or alternatively, the insert assembly can be manufactured from the material different from that of the casing. Insert materials can be selected from a group of metals which withstand higher temperatures, are inert in chemical reactions and/or decrease coking (or at least do not increase coking).

In preferred configurations, the insert assembly and any one of the insert units is/are composed, partly or fully, of a material capable of being flexed or bent without breaking (i.e. being not stiff). This can be achieved by manufacturing the insert units from relatively thin sheets of metal or metal alloys.

In some other configurations, the insert assembly and at least some of the insert units included therein may be composed, partly or fully, of less bendable material, such as for example ceramic material or any other suitable refractory material.

Using ceramic or other refractory for manufacturing at least the parts of the insert assembly may extend the service life of the apparatus 100. Ceramic materials are inert, have good (thermal) insulation- and thermal shock resistance properties and can be prefabricated or casted into a desired/required shape. Exemplary ceramic materials includes composites, where alumina ($Al_2O_3$), silica ($SiO_2$), silicon carbide, zircon, etc. are mixed with a variety of binders to yield a rheological consistency suitable for forming.

In some configurations, the insert units within the insert assembly 10 can be composed of the same material or different material. For example, the insert units connectable to the inlet(s) and the outlet(s) of the apparatus 100 (see the insert segments 10-1, 10-2 with the flowguides 11; rf. 10C, FIG. 3) may be formed of a first material, and the insert units not directly connectable to the inlet(s)/outlet(s) (10-3 and 10-4 without flowguides 11; rf. 10C, FIG. 3) may be formed of a second material different from the first material. In configuration like 10C, the insert units adjoining and/or connected to the inlet(s) and the outlet(s) can be, fully or partly, composed of a more heat-resistant material in comparison to other segments.

In the insert assembly 10 (10A, 10B, 10C), any one of the insert units can be composed of portions made of the same material or different material.

Reference is made to FIG. 6 showing the insert assembly 10 provided as an internal shell liner inside the gas casing 6. The insert units/insert modules adjoining the inlet- and outlet branch pipes (8 and 9, respectively) have end extensions, which protrude inside the branch pipes 8 and 9. The shell liner with end extensions is shown in dashed line. The insert assembly may thus extend to a predetermined length into any one of the inlet branch pipe and to the outlet branch pipe in a manner of a tubesheet lining. By virtue of its end extensions, the insert assembly may extend into the inlet/outlet tubes till a connection flange 18 and/or through said flange.

In the arrangement shown on FIG. 6, the entire assembly 10 may be made of the same material, such as for example metal, metal alloy, ceramic or other refractory material. Alternatively, the shell liner may be made of a first material and the end extensions may be made of a second material different from the first material. By way of example, the end extensions may be made of ceramic or other refractory material for better heat insulation, while the shell liner having flowguide channels etc. may be made of metal. The end extensions made of ceramic may adopt a ferrule design for example.

Any combination of appropriate materials can be conceived.

In an aspect, a rotary apparatus 100 for thermally treating fluids is provided. The apparatus comprises a rotor with a plurality of rotor blades arranged over a circumference of a rotor hub 3A mounted onto a rotor shaft 1 and forming a rotor blade cascade 3; a plurality of stationary vanes arranged into essentially annular vane cascades 2, 4 adjacently disposed with regard to the rotor blade cascade such, as to form a stator-rotor-stator arrangement 2, 3, 4; a casing 6, in which a duct is formed with at least one inlet 8 and at least one outlet 9, said casing enclosing the rotor blade cascade and the stationary vane cascades inside the duct, and an insert assembly 10, 10A, 10B, 10C, wherein, in said apparatus, the insert assembly is positioned inside the duct such, as to form a guideway to direct a stream of fluidic medium entering the duct through the at least one inlet 8 towards the stator-rotor-stator arrangement and to further direct the stream of fluidic medium exiting the stator-rotor-stator arrangement towards the at least one outlet 9, respectively, and wherein, by virtue of the insert assembly, temperature distribution inside the casing is equalized and thermal stresses generated in the casing during propagation of thermally treated fluidic media through the duct are reduced.

The apparatus advantageously comprises the insert assembly 10, 10A, 10B, 10C according to any configuration outlined hereinabove.

In a further aspect, a method for reducing thermal stresses and related deformations in a rotary apparatus during thermal treatment of fluids is provided, the method comprises at least the following steps:

(a) obtaining a rotary apparatus 100 comprising: a rotor comprising a plurality of rotor blades arranged over a circumference of a rotor hub 3A mounted onto a rotor shaft 1 and forming a rotor blade cascade 3, a plurality of stationary vanes arranged into essentially annular vane cascades 2, 4 adjacently disposed with regard to the rotor blade cascade such, as to form a stator-rotor-stator arrangement 2, 3, 4, and a casing 6, in which a duct is formed with at least one inlet 8 and at least one outlet 9, said casing enclosing the rotor blade cascade and the stationary vane cascades inside the duct, (b) placing an insert assembly 10, 10A, 10B, 10C inside the duct to form a guideway to direct a flow of fluidic medium entering the duct through the at least one inlet 8 towards the stator-rotor-stator arrangement and to further direct the flow of fluidic medium exiting the stator-rotor-stator arrangement towards the at least one outlet 9, respectively, and (c) propagating fluidic medium through the duct between the inlet and the outlet to thermally treat said fluidic medium, wherein, by virtue of the insert assembly, temperature distribution inside the casing is equalized and thermal stresses generated in the casing during propagation of thermally treated fluidic media through the duct are reduced.

In embodiments, the process of thermal treatment involve raising the temperature of the fluidic medium by at least about 400 degrees Celsius (° C.).

Accordingly, the apparatus 100 may be rendered with a (pre) heater functionality. Hence, the process of thermal treatment can be direct heating of various fluids, such as process gases, inert gases, air or any other gases or indirect heating of fluids (liquids, vapor, gas, vapor/liquid mixtures etc.). Heated fluid generated in the rotary apparatus can be used for heating of any one of gases, vapor, liquid, and solid materials. The rotary apparatus can at least partly replace- or it can be combined with (e.g. as a pre-heater) multiple types of furnaces, heaters, kilns, gasifiers, and reactor devices that are traditionally fired or heated with solid, liquid or gaseous fossil fuels or in some cases bio-based fuels.

The process of thermal treatment can involve heat-assisted conversion of feedstocks in fluidic media, optionally, thermal- or thermochemical cracking of hydrocarbon-containing feedstocks. Cracking processes involve fluidized hydrocarbon-containing feedstocks (viz., fluidized organic feedstock matter that primarily comprises carbon- and hydrogen). In some instances, the process of thermal treatment is steam cracking of hydrocarbon containing feedstocks in fluidic media.

When propagating through the apparatus 100, the fluidic medium passes the cascades 2, 3 and 4 several times and during each passage the temperature of the fluidic medium is raised to a predetermined value (more precisely, temperature rise occurs when the stream of fluidic medium exits the rotor blades and passes through the diffuser and the vaneless space 7). The amount of thermal energy added to the medium is sufficient to initiate chemical degradation reactions, such breaking down chemical bonds between long carbon-hydrogen (C—H) chains, for example. Hence, high molecular weight compounds present in the fluidic stream are effectively size-reduced.

Additionally or alternatively, the heat-assisted conversion of feedstocks may involve processing oxygen-containing feedstock matter, such as oxygen-containing hydrocarbon derivatives. In some configurations, the apparatus 100 can be adapted to process cellulose-based feedstocks. In some additional or alternative configurations, the apparatus 100 can be adapted to process (waste) animal fats- and/or (waste) vegetable oil-based feedstocks. Preprocessing of said animal fats- and vegetable oil-based feeds may include hydrodeoxygenation (removal of oxygen from oxygen containing compounds) that results in breaking down (tri)glyceride structures and yields mostly linear alkanes. In further additional or alternative configurations, the apparatus 100 can be adapted to process by-products of wood pulp industry, such as tall oil or any derivatives thereof. The definition "tall oil" refers to by-product(s) of the commonly known Kraft process used upon pulping primarily coniferous trees in wood pulp manufacture.

In the process, the hydrocarbon-containing feed is provided as including, but not limited to any one of the following: medium weight hydrocarbons, such as naphthas and gasoils, and light weight hydrocarbons, such as ethane, propane, and butanes. Propanes and heavier fractions can be further utilized.

In some instances, the hydrocarbon-containing feed is a gasified preprocessed biomass material. Biomass-based feed is cellulose-derived or, in particular, lignocellulose-derived preprocessed biomass, supplied into the apparatus in substantially gaseous form.

The hydrocarbon-containing feed can be further provided as any one of the preprocessed glyceride-based material, such as (waste or residual) vegetable oils and/or animal fats, or preprocessed plastic waste or residue. Preprocessing of said (tri)glyceride-based feedstocks may include different processes, such as pyrolysis or deoxygenation, as described above. A range of plastic waste comprising PVC, PE, PP, PS materials and mixtures thereof can be utilized in the processes of recovery of pyrolysis oil or gas that can be further used as a feedstock for producing new plastics and/or refined to fuel oil(s) (diesel equivalents).

Hence, in selected embodiments, the apparatus 100 an be configured for executing an at least one procedure selected from the group consisting of: processing hydrocarbon feedstock preferably containing medium and light weight hydrocarbon fractions; processing gasified carbohydrate-containing feedstock matter, processing gasified glyceride- and/or fatty acid-containing feedstock matter, and processing gasified cellulosic biomass material. Hereby, the apparatus 100 is configurable for processing oxygen-containing feedstock materials derived from bio-based feedstock, for example. Possible application areas include refining of biomass-based or biomass-derived matter to produce renewable fuels in processes such as direct catalytic hydrogenation of vegetable oil or animal fats into corresponding alkanes or catalytic dehydrogenation of gaseous hydrocarbons as one of the stages of Fischer-Tropsch process, for example, for example. Additionally, the apparatus may be configured for valorization (enhancement or refinement of gaseous matter) of bio-based pyrolysis gas or syngas.

In an event of utilization of feedstocks based on biomass-, glyceride- and/or polymeric substances, the apparatus 100 may be further adapted for catalytic processes. This is achieved by a number of catalytic surfaces (not shown) formed by catalytic coating(s) of the blades or internal walls being in contact with process fluid(s). In some instances, the apparatus may comprise a number of catalytic modules defined by ceramic or metallic substrate(s) or support carrier(s) with an active (catalytic) coating optionally realized as monolithic honeycomb structures.

It is clear to a person skilled in the art that with the advancement of technology the basic ideas of the present invention may be implemented in various ways. The invention and its embodiments may generally vary within the scope of the appended claims.

The invention claimed is:

1. A system comprising:
a rotary apparatus configured to thermally treat fluids, the rotary apparatus comprising:
a rotor comprising
a rotor hub,
a rotor shaft, and
a plurality of rotor blades arranged over
a circumference of the rotor hub mounted onto the rotor shaft and forming a rotor blade cascade,
a plurality of stationary vanes arranged into annular vane cascades adjacently disposed with regard to the rotor blade cascade to form a stator-rotor-stator arrangement, and
a casing, in which a duct is formed with at least one inlet and at least one outlet, said casing enclosing the rotor blade cascade and the annular vane cascades inside the duct; and
an insert assembly configured to be used in the rotary apparatus, the insert assembly being shaped and positioned inside the duct such that guideways are formed that direct a stream of fluidic medium entering the duct through the at least one inlet towards the stator-rotor-stator arrangement and direct the stream of fluidic medium exiting the stator-rotor-stator arrangement towards the at least one outlet, respectively.

2. The system of claim 1, wherein the system is configured to direct the stream of fluidic medium entering the duct through the at least one inlet towards a stationary guide vane cascade of the annular vane cascades of the stator-rotor-stator arrangement, and to direct the stream of fluidic medium exiting a stationary diffuser vane cascade of the annular vane cascades of the stator-rotor-stator arrangement towards the at least one outlet, respectively,
wherein the stationary guide vane cascade is disposed upstream of the rotor blades and the stationary diffuser vane cascade is disposed downstream of the rotor blades.

3. The system of claim 1, further comprising a plurality of insert units.

4. The system of claim 3, wherein the insert units are arranged inside the duct to adjoin any one of the at least one inlet and the at least one outlet.

5. The system of claim 3, wherein all of the insert units are spaced apart from one another.

6. The system of claim 3, wherein the insert units adjoin one another inside the duct to form a shell liner inside the casing.

7. The system of claim 6, wherein the insert units adjoin one another in a non-hermetic manner to allow circulation of gaseous media through gaps remaining along areas where the insert units adjoin.

8. The system of claim 6, wherein the shell liner formed inside the casing encompasses the stator-rotor-stator arrangement.

9. The insert assembly system of claim 6, wherein the shell liner is formed with one or more of the insert units positioned adjacent to a stationary guide vane cascade of the annular vane cascades and with one or more of the insert units positioned adjacent to a stationary diffuser vane cascade of the annular vane cascades.

10. The system of claim 6, which wherein the system at least partly defines a vaneless space formed in the duct between an exit from the stator-rotor-stator arrangement and an entrance thereto, thereby the vaneless space is defined by at least a part of a duct volume between an inner surface of the insert assembly and an outer surface of a flow-shaping device disposed inside the casing.

11. The system of claim 3, wherein the insert units are installed in the casing to enable their movement one or more of: (i) relative to one another, and (ii) relative to the casing.

12. The system of claim 3, wherein a number of through-holes is arranged on the surfaces of at least some of the insert units for supplying additional gaseous media into the duct.

13. The system of claim 3, wherein the insert units have a smaller wall thickness relative to the casing, and optionally wherein at least some of the insert units are made of a material different from a material of the casing.

14. The system of claim 3, wherein any one of the insert units is composed, partly or fully, of metal or metal alloys.

15. The system of claim 3, wherein any one of the insert units is composed, partly or fully, of a ceramic material.

16. The system of claim 3, wherein any one of the insert units is composed of portions made of the same material or different material.

17. The system of claim 1, wherein the insert assembly is configured to attach to any one of the annular vane cascades.

18. The system of claim 1, wherein the insert assembly is replaceable.

19. A rotary apparatus for thermally treating fluids, the rotary apparatus comprising:
a rotor comprising
a rotor hub,
a rotor shaft, and
a plurality of rotor blades arranged over a circumference of the rotor hub mounted onto the rotor shaft and forming a rotor blade cascade;
a plurality of stationary vanes arranged into annular vane cascades adjacently disposed with regard to the rotor blade cascade to form a stator-rotor-stator arrangement;
a casing, in which a duct is formed with at least one inlet and at least one outlet, said casing enclosing the rotor blade cascade and the annular vane cascades inside the duct; and
an insert assembly shaped and positioned inside the duct such that guideways are formed that direct a stream of fluidic medium entering the duct through the at least one inlet towards the stator-rotor-stator arrangement and direct the stream of fluidic medium exiting the stator-rotor-stator arrangement towards the at least one outlet, respectively.

20. The apparatus of claim 19, further comprising selected vanes within the stationary vane cascades configured as attachment points to the insert assembly.

21. The apparatus of claim 19, wherein the insert assembly is provided in the form of a shell liner inside the casing, and
wherein a duct volume formed between said shell liner and the casing is filled with an insulation material.

22. The apparatus of claim 19, wherein the apparatus is configured as a reactor for heat-assisted in fluidic conversion of feedstocks media, optionally, as a reactor for thermal- or thermochemical cracking of hydrocarbon-containing feedstocks.

23. A method for reducing thermal stresses and related deformations in a rotary apparatus during thermal treatment of fluids, the method comprising:
obtaining a rotary apparatus comprising:
a rotor comprising
a rotor hub,
a rotor shaft, and
a plurality of rotor blades arranged over a circumference of the rotor hub mounted onto the rotor shaft and forming a rotor blade cascade,
a plurality of stationary vanes arranged into annular vane cascades adjacently disposed with regard to the rotor blade cascade to form a stator-rotor-stator arrangement, and
a casing, in which a duct is formed with at least one inlet and at least one outlet, said casing enclosing the rotor blade cascade and the annular vane cascades inside the duct;
placing an insert assembly inside the duct to form guideways to direct a stream of fluidic medium entering the duct through the at least one inlet towards the stator-rotor-stator arrangement and to direct the stream of fluidic medium exiting the stator-rotor-stator arrangement towards the at least one outlet, respectively; and
propagating the stream of fluidic medium through the duct between the at least one inlet and the at least one outlet to thermally treat said fluidic medium,
wherein, by virtue of the insert assembly, temperature differentials inside the casing is limited and thermal stresses generated in the casing during propagation of thermally treated fluidic media through the duct are limited.

24. The method of claim 23, wherein conditions for thermally treating the fluidic medium inside the duct are established when an amount of thermal energy is imparted into the stream of fluidic medium by virtue of a series of energy transformations occurring when said stream of fluidic medium successively passes through the rotor blade cascade and the annular vane cascades forming the stator-rotor-stator arrangement and through a vaneless space, respectively, while propagating within the duct between the at least one inlet and the at least one outlet.

25. The method of claim 23, wherein the stream of fluidic medium successively passes through the rotor blade cascade and the annular vane cascades forming the stator-rotor-stator arrangement and through the vaneless space, respectively, in accordance with a substantially helical flow path.

26. The method of claim 23, wherein a process of thermal treatment of the fluidic medium involves raising the temperature of the fluidic medium by at least 400 degrees Celsius (° C.).

27. The method of claim 26, wherein the process of thermal treatment involves heat-assisted conversion of feedstocks in fluidic media, optionally, thermal- or thermochemical cracking of hydrocarbon-containing feedstocks.

* * * * *